United States Patent Office 3,318,934
Patented May 9, 1967

3,318,934
TERTIARY ALKOXY-ALUMINUM DIALKYLS
AND THEIR MANUFACTURE
Ernst Georg Hoffmann and Walter Tornau, Mulheim an
der Ruhr, Germany, assignors to Karl Ziegler, Mulheim an der Ruhr, Germany
No Drawing. Filed June 27, 1962, Ser. No. 205,568
Claims priority, application Germany, June 30, 1961,
Z 8,837
19 Claims. (Cl. 260—448)

While alkoxy-aluminium dialkyls of the formula R'OAlR$_2$, wherein R' signifies a primary alkyl radical are known and a few materials of this type have also been described, in which R' signifies a secondary radical, compounds of this kind in which R' is a tertiary alkyl radical have not previously been described and represent a novel class. An example of such novel class is tertiary butoxyaluminium diethyl of the formula

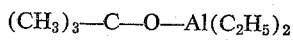

A primary object of the present invention is the provision of a class of novel chemical substances, namely, organo-aluminium compounds of the general formula AlR$_2$OR', wherein R signifies a hydrocarbon radical linked to the aluminium through a saturated aliphatically bound carbon atom, and OR' a radical in which the essential grouping

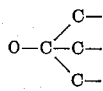

is present, which novel chemical substances can be manufactured by various means, as hereinafter set forth, which are within the scope of our invention.

Specifically in relation to the said novel class of compounds the radical R may for example be methyl-, ethyl-, propyl-, normal or secondary butyl- or cyclopentyl-, while the radical R' may be tert.-butyl-, tert.-pentyl-, or other tertiary radical having up to 10 or more carbon atoms.

It has been found that these novel substances possess surprising and unusual characteristics; they have, for example, an unexpected degree of stability or react only slightly towards certain other materials which are generally known to react vigorously with organo-aluminium compounds such as aluminium trialkyls and alkoxy-aluminium dialkyls with primary or secondary radicals in the alkoxy group. The known alkoxy-aluminium dialkyls, for example, when agitated with water, react extremely vigorously with complete hydrolysis to yield aluminium hydroxide, alcohol and 2 molecules of a hydrocarbon RH. If agitated with air or oxygen, the oxygen is very rapidly absorbed and oxidation products are formed, in particular aluminium alcoholates. The tertiary alkoxy-aluminium dialkyls of the present invention absorb oxygen several times more slowly under comparable conditions. In many cases, even the commencement of slight absorption can only be observed after shaking has been continued for some hours. The reactivity with regard to moisture is somewhat more pronounced, but even here a basic difference may be noted between the reaction of, say, tertiary butoxy-aluminium-dimethyl and the cyclohexyloxy-aluminium diethyl that resembles it in this aggregate condition. Both substances have a wax-like consistency and are readily reduced to powder. If cyclohexyloxy-aluminium diethyl is rubbed between slightly damp fingers, considerable heat is immediately felt, while with the comparable material containing a tertiary alkyl group on the oxygen atom no noticeable heat is generated. If the two materials are tipped on to water, the first will undergo rapid decomposition while with the second disintegration will only become apparent after some time. The differences between alkoxy-aluminium dialkyls with primary alkyl groups on the oxygen and those with tertiary groups are much greater. In this case, the experiment of rubbing between the fingers is impossible as it would lead to immediate and severe burning.

In general the reactivity of such organo-aluminium compounds decreases with increased molecular weight, i.e. with lower percentages of organo-aluminium present in the molecule, but with rising molecular weight the above-mentioned marked differences are retained.

It is known that, in general, by introducing large tertiary groups into organic molecules the reaction capacity of certain adjacent functional groups can be reduced. It was not to be expected, however, that in the case of alkoxy-aluminium-dialkyls this reduction of reactivity would be so significant for the particular reactivity of organo-aluminium compounds lies in the Al—C bonds contained in them. In tertiary alkoxy-aluminium dialkyls, no change has been effected in the immediate vicinity of the Al—C bonds, and a voluminous radical is merely present on the oxygen atom and this should no longer have a decisive influence on the reactivity.

Alkoxy-aluminium dialkyls are of technical importance as intermediates or auxiliaries for various metallo-organic reactions. For example, the alkali alkoxy-aluminium trialkyls derived from them are important in connection with the separation of lead tetra-ethyl and aluminium triethyl or directly, as components of electrolyte mixtures for electrolytic processes. The use of the new tertiary alkoxy-aluminium dialkyls in place of their counterparts with primary or secondary radicals will permit simpler and safer processes. In fact, the use of these materials means that the exclusion of air need no longer be so rigidly observed as with the comparable compounds previously known. In addition, all danger of spontaneous combustion is eliminated.

The class of novel substances with which the invention is concerned have a further surprising and extremely valuable property. Relatively speaking, they have great thermal stability. True aluminium trialkyls under various other conditions are more reactive and more sensitive than aluminium alcoholates. Alcoholates, which are derived from primary and secondary alcohols, are quite resistant to heat and can withstand temperatures of as much as 300° or more. It is known, however, that aluminium tri-tertiary-butylate decomposes at temperatures as low as 130 to 140°, with separation of isobutylene+tertiary butyl alcohol and formation of aluminium oxide.

With the general rise in reactivity on turning from alcoholates to true organo-aluminium compounds, it might have been anticipated that the combination of structural elements in a tertiary alkyl alcoholate of a dialkyl aluminium would lead to materials of still lower thermal stability than aluminium tri-tertiary-butylate. Surprisingly, it has been found that the novel class of substances have much greater thermal stability than the aluminium alcoholates of tertiary alcohols. The decomposition temperature is usually above 250° and only in isolated cases is the limit of thermal stability in the region of 180 to 220°.

This feature increases the usefulness of the product. It is, for example, necessary when converting the novel class of compounds into alkali-alkyl complex compounds for use as electrolyte components, to heat them with sodium hydride and ethylene to between 180 and 200°, and these temperatures they withstand quite satisfactorily.

The novel substances can be produced in accordance with the present invention by reacting compounds of the formula R$_2$AlX, wherein R has the significance already stated and X stands for hydrogen, halogen or an alkyl radical in manner analogous to known procedures for the production of alkyl-aluminium dialkyls. Thus for example:

(1) Aluminium trialkyls are reacted with tertiary alcohols according to the equation $$R_3Al + \text{tert.alkyl } OH = RH + R_2AlO\text{-tert.alkyl}$$

Processes of this type are, for example, described by N. Davidson & H. C. Brown, J. A. Chem Soc., vol 64, page 316 (1942) and in FIAT review of German Science, 1939–1946, Wiesbaden, Dieterich'sche Verlagsbuchhandlung, edited by W. Klemm; G. Bähr "Metallorganische Verbindungen," 1948, vol. 24, page 160.

(2) Dialkyl aluminium hydrides are reacted with tertiary alcohols according to the equation $$R_2AlH + \text{tert.alkyl } OH = H_2 + R_2AlO\text{-tert.alkyl}$$

This method of treating dialkyl aluminium hydrides with alcohols stems from the known Figure 1 and a number of references, such as Annalen 629, page 23, where aluminium bonded to hydrogen always reacts before aluminium bonded to alkyl radicals, and naturally reacts more readily than alkyl on aluminium.

(3) Dialkyl aluminium halides are reacted with alkali alcoholates of tertiary alcohols according to the equation $$R_3AlCl + KO\text{-tert.alkyl} = KCl + R_2AlO\text{-tert.alkyl}$$

The process is described in many parallel cases. The reaction of such halogenated compounds with alkali alcolohates to yield the corresponding alkoxy compounds is known.

(4) Aluminium trialkyls are reacted with alkali alcoholates of tertiary alcohols according to the equation $$2R_3Al + KO\text{-tert.alkyl} = KAlR_4 + R_2AlO\text{-tert.alkyl}$$

This process is based on known data, namely:

(a) the addition of an alkali alcoholate to an aluminium trialkyl—see for example the statements by A. V. Grosse and I. M. Mavity, J. Org. Chem., vol. 5, page 107.
(b) according to Belgian Patent 575,641, a sodium alkoxy-aluminium trialkyl with aluminium triethyl immediately yields sodium aluminium tetra-ethyl and free monoalkoxy-aluminium diethyl.

(5) Dialkyl aluminium halides are reacted with alkali-di-tert-alkoxy-aluminium dialkyls according to the equation $$R_2AlCl + Na[R_2Al(O\text{-tert.alkyl})_2]$$
$$= NaCl + 2R_2AlO\text{-tert.alkyl}$$

This process is analogous to that represented by the equation $$(C_2H_5)_2AlBr + Na[Al(C_2H_5)_4] = 2Al(C_2H_5)_3 + NaBr$$

and described by A. V. Grosse and I. M. Mavity, loc. cit., page 111, while on pages 118 and 119 the following reactions are also mentioned by the same authors:

$$2Al(CH_3)_3 + Al(OCH_3)_3 = 3Al(CH_3)_2OCH_3$$

and $$2Al(C_2H_5)_3 + Al(OC_2H_5)_3 = 3Al(C_2H_5)_2OC_2H_5$$

From these it seems evident that there is a tendency to maximum distribution of the alkyl and other groups among the various aluminium atoms.

Where reference is made herein to tertiary alkyl radicals this only signifies radicals in general that are derived from alcohols with the following characteristic grouping:

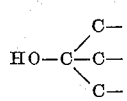

i.e. the invention not only covers materials of the following composition:

$$(C_2H_5)_2AlOC(CH_3)_2C_2H_5$$
$$(C_2H_5)_2AlOC(C_4H_9)_3$$

but also, for example:

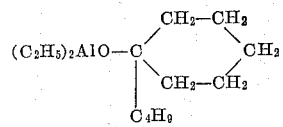

Similarly, the "alkyl" bonded to the aluminium is meant to comprise a hydrocarbon radical, wherein a saturated aliphatic portion, preferably primarily linked, is linked directly to the aluminium atom, as for example, in the following compound:

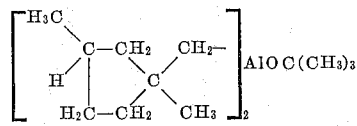

The invention and the properties of some of the novel products within the scope of the claims are illustrated in the examples which follow. These, however, are in no way limitative and insofar as they describe procedures for the manufacture of novel substances it is to be understood that in all cases the reactions were effected in the presence of an inert gas.

*Example 1*

Aluminium triethyl is dissolved preferably in the same or up to twice the amount of a fairly volatile solvent, such as benzene or pentane, and 95% of the equivalent amount of anhydrous tertiary butanol is slowly added with cooling, having previously been liquefied by the addition of a little of the same solvent. When the evolution of gas has ended, the solvent is drawn off, first at 10–20 Torr and then at $10^{-2}$ to $10^{-4}$ Torr, with gentle heating to approximately 50° C. The tertiary butoxy-aluminium diethyl is then distilled off at $10^{-3}$ Torr.

The majority of dialkyl aluminium-tertiary-alkoxy compounds quoted in the table were produced by this process, though in some cases the distillation had to be omitted. When treating the aluminium triethyl with the tertiary butanol, reaction can also be carried out in the absence of solvents, but the tertiary butanol must then be stirred in very carefully and with thorough cooling. The same is true in the next example.

*Example 2*

Diethyl aluminium hydride diluted with 2 parts pentane is slowly decomposed with a 50% solution of anhydrous tertiary butanol in pentane until hydrogen formation has ended. Further working up is carried out as in Example 1.

*Example 3*

The stoichiometric quantity of diethyl aluminium chloride in an approximately 50% benzene solution is vigorously stirred in a finely divided suspension of potassium tertiary-butylate in toluene, obtained by dissolving potassium in anhydrous tertiary butanol and removing the excess tertiary butanol in vacuo. Conversion proceeds smoothly, with heating. When the reaction is complete, the solution is drawn off from the potassium chloride precipitate and worked up as in Example 1. The method described here is a popular version of the process, which permits particular safety. The reaction between potassium tertiary-butylate and diethyl aluminium chloride does, however, proceed quite smoothly under other conditions.

*Example 4*

A finely divided suspension of 1 mol sodium tertiary-butylate in decahydronaphthalene, obtained by dissolving sodium in anhydrous tertiary butanol and removing the excess tertiary butanol in vacuo is slowly stirred into 2 mols aluminium triethyl at 130° C.; stirring is continued for half an hour at this temperature. The upper phase of the resulting two liquid phases is siphoned off from the molten sodium aluminium tetra-ethyl and worked up as in Example 1.

SPECIAL PROPERTIES OF SOME TERTIARY ALKOXYALUMINUM DIALKYLS

| Material | Average speed of decomposition of 0–20% in mol percent per minute | Alcoholysis [1] Time in minutes for the decomposition of— | | | Concentration in ml. decalin per g. material | Average oxidation speed of 0–20% in mol percent per minute | F.P. (° C.) | B.P. (° C.) | Properties |
|---|---|---|---|---|---|---|---|---|---|
| | | 10% | 30% | 50% | | | | | |
| Comparative materials: | | | | | | | | | |
| $(C_2H_5)_2AlO\,C_4H_9$ | 69 | 0.25 | 0.32 | 0.42 | 6 | 3.3 | | 97 (0.15T) | Liquid, violent reaction with water and especially with alcohol. |
| $(C_2H_5)_2AlOCH\begin{array}{c}CH_2-CH_2\\ \phantom{x}\\ CH_2-CH_2\end{array}CH_2$ | 120 | 0.15 | 0.18 | 0.20 | 6 | 2.5 | ~60 | 120 (HV [2]) | Crystalline, friable, can be crumbled in the hand with sharp rise in temperature, vigorous decomposition in water. |
| A. Variation of alkyl groups: | | | | | | | | | |
| $(CH_3)_2AlOC(CH_3)_3$ | 39 | 0.37 | 0.69 | 1.1 | 6 | ([3]) | 73 | 102–106 (14T) | Solid, microcrystalline, wax-like can be kneaded in the hand without perceptible heating, decomposes above 250°. |
| $(C_2H_5)_2AlOC(CH_3)_3$ | 2.5 | 5.5 | 10 | 16 | 1 | 0.012 | 162 (solid. pt. indet.) | ~70 (HV [2]) | Glass-like solid, recrystallises microcrystalline, wax-like, decomposes above 250°. |
| $(C_3H_7)_2AlOC(CH_3)_3$ | 0.65 | 18 | 45 | 80 | 1 | ([3]) | 70 (solid. pt) | (HV [2]) 87–89 | Solid, friable-brittle, decomposes above 250°. |
| $(C_4H_9)_2AlOC(CH_3)_3$ | 0.25 | 34 | 200 | | 1 | ([3]) | 69.(6) (solid. pt) | 110 (HV [2]) | Do. |
| $[(CH_3)_2CH_2CH]_2AlOC(CH_3)_3$ | 0.034 | 300 | 950 | 2,000 | ([4]) | 0.0010 | 67 (solid. pt) | 112 (HV [2]) | Solid, friable-brittle, dissolves in conc. sulph. acid and only decomposes when heated carefully with gas develop. decomposes above 250°. |
| $\begin{Bmatrix}CH_2-CH_2\\ \phantom{x}\\ CH-CH_2\\ \phantom{x}\\ CH_3\end{Bmatrix}_2 \begin{array}{c}C-CH_2\\ \phantom{x}\\ CH_3\end{array} AlOC(CH_3)_3$ | <0.1 | | | | | ([3]) | >60 | Not dist. able | Solid, friable, decomposes above 230°. |
| B. Variation of the alkoxy radical: | | | | | | | | | |
| $(C_2H_5)_2AlOC(CH_3)_2C_2H_5$ | <0.1 | | | | | ([3]) | ~50 | 115 (HV [2]) | Finely crystalline, decomposes above 250°. |
| $(C_2H_5)_2AlOC(C_4H_9)_3$ | 0.0059 | 1,200 | 6,000 | | 1 | ([3]) | 110–120 (heating) | Not dist. able | Microcrystalline, brittle, decomposes above 180°. |
| $(C_2H_5)_2AlOC\begin{array}{c}CH_2-CH_2\\ \phantom{x}\\ C_4H_9\ CH_2-CH_2\end{array}CH_2$ | <0.1 | | | | | ([3]) | >68 | do | White, microcrystalline, brittle, decomposes above 220°. |

[1] 2-ethylhexanol-1 was used at 25° C.
[2] HV = The vacuum of about $10^{-3}$ to $10^{-4}$ Torr achieved in the dist. apparatus by means of a diffusion pump.
[3] No perceptible reaction after 1 hour.
[4] Undiluted.

Example 5

The stoichiometric amount of diethyl aluminium chloride is stirred under moderate heat into a concentrated benzene solution of sodium-di-tertiary-butoxyaluminium diethyl, obtained by adding 2 mols tertiary butanol to 1 mol sodium aluminium tetra-ethyl. Stirring is continued for a further hour at 80° and the solution is siphoned off from the sodium chloride precipitate and worked up as in Example 1.

The table above sets out the properties of a series of new compounds manufactured according to the present invention.

The embodiments of the invention in which an exclusive property or privilege is claimed are defined as follows:

1. Monoalkoxy organo-aluminum compound having the formula $R_2AlOR'$ wherein R is a hydrocarbon selected from the group consisting of alkyl and cycloalkyl of which the carbon atom thereof linked directly to the Al-atom is saturated and wherein R' is a tertiary alkyl hydrocarbon having up to 13 carbon atoms and containing the linkage

with the tertiary carbon atom thereof linked directly to the O-atom.

2. Compound according to claim 1 wherein said alkyl and cycloalkyl are lower alkyl and cyclo lower alkyl, said compound being normally a solid at room temperature and only decomposing at an elevated temperature of at least about 180° C.

3. Compound having the formula $(CH_3)_2AlOC(CH_3)_3$.
4. Compound having the formula
$(C_2H_5)_2AlOC(CH_3)_3$.
5. Compound having the formula
$(C_3H_7)_2AlOC(CH_3)_3$.
6. Compound having the formula
$(C_4H_9)_2AlOC(CH_3)_3$.
7. Compound having the formula
$[(CH_3)_2CH_2CH]_2AlOC(CH_3)_3$.
8. Compound having the formula

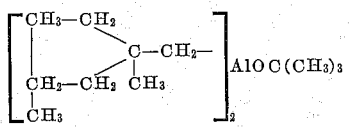

9. Compound having the formula
$(C_2H_5)_2AlOC(CH_3)_2C_2H_5$.
10. Compound having the formula
$(C_2H_5)_2AlOC(C_4H_9)_3$.
11. Compound having the formula

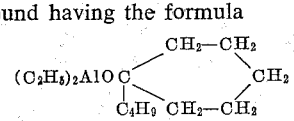

12. Process for producing monoalkoxy organo-aluminum compounds having the formula $R_2AlOR'$ wherein R is a hydrocarbon selected from the group consisting of alkyl and cycloalkyl of which the carbon atom thereof linked directly to the Al-atom is saturated and wherein R' is a tertiary alkyl hydrocarbon having up to thirteen carbon atoms containing the linkage

with the tertiary carbon atom thereof linked directly to the O-atom, which comprises reacting in the presence of an inert gas a compound having the formula $R_2AlX$, wherein R is the same as defined hereinabove and X is selected from the group consisting of hydrogen, halogen and R as defined hereinabove, with a compound having the formula YOR', wherein R' is the same as defined above and Y is hydrogen when X is one of hydrogen and R as defined above, Y being alkali metal when X is one of halogen and R as defined above, and Y being alkali metal—$R_2Al(OR')$ with R and R' being the same as defined above when X is halogen, to form thereby the corresponding $R_2AlOR'$ compound.

13. Process according to claim 12 wherein said alkyl and cycloalkyl are lower alkyl and cyclo lower alkyl and said tertiary alkyl hydrocarbon contains up to 13 carbon atoms.

14. Process according to claim 13 wherein said tertiary alkyl hydrocarbon is tertiary butyl.

15. Process for producing dialkylaluminum tertiary alkoxy compounds which comprises reacting in the presence of an inert gas trialkylaluminum with tertiary alkylol having up to thirteen carbon atoms to form thereby the corresponding dialkylaluminum tertiary alkoxy compound.

16. Process for producing dialkylaluminum tertiary alkoxy compounds which comprises reacting in the presence of an inert gas dialkylaluminum hydride with tertiary alkylol having up to thirteen carbon atoms to form thereby the corresponding dialkylaluminum tertiary alkoxy compound.

17. Process for producing dialkylaluminum tertiary alkoxy compounds which comprises reacting in the presence of an inert gas dialkylaluminum halide with alkali tertiary alkylolate having up to thirteen carbon atoms to form thereby the corresponding dialkylaluminum tertiary alkoxy compound.

18. Process for producing dialkylaluminum tertiary alkoxy compounds which comprises reacting in the presence of an inert gas trialkylaluminum with alkali tertiary alkylolate having up to thirteen carbon atoms to form thereby the corresponding dialkylaluminum tertiary alkoxy compound.

19. Process for producing dialkylaluminum tertiary alkoxy compounds which comprises reacting in the presence of an inert gas dialkylaluminum halide with alkali-dialykylaluminum-di-tertiary alkoxy having up to 13 carbon atoms in each tertiary alkoxy group to form thereby the corresponding dialkyl aluminum tertiary alkoxy compound.

References Cited by the Examiner

FOREIGN PATENTS 1,085,515   7/1960   Germany.
878,136   9/1961   Great Britain.

OTHER REFERENCES

Davidson et al., Journal of American Chemical Society, vol. 64, pages 316–324 (1942).

Grosse et al. II, J. Organic Chemistry, vol. 5, pages 106–121 (1940).

Grosse et al., Library Bulletin of Abstracts, Universal Oil Products Co., vol. 13, No. 41, Oct. 12, 1938, p. 164.

Mehrotra, Jour. Indian Chemical Society, vol. 30, No. 9, pages 585–591 (1953).

Pearl et al., J. Organic Chemistry, vol. 22, pages 1266–67 (1957).

TOBIAS E. LEVOW, *Primary Examiner.*

A. LOUIS MONACELL, HELEN M. McCARTHY, *Examiners.*

I. R. PELLMAN, H. M. S. SNEED, *Assistant Examiners.*